Sept. 6, 1966     J. S. LIEN     3,271,525
SOUND REPRODUCER EQUIPPED CASH REGISTER
Filed July 11, 1962     3 Sheets-Sheet 1

INVENTOR:
JØRGEN SIGURD LIEN,
BY
Richards & Geier
ATTORNEYS

Sept. 6, 1966 J. S. LIEN 3,271,525
SOUND REPRODUCER EQUIPPED CASH REGISTER
Filed July 11, 1962 3 Sheets-Sheet 2
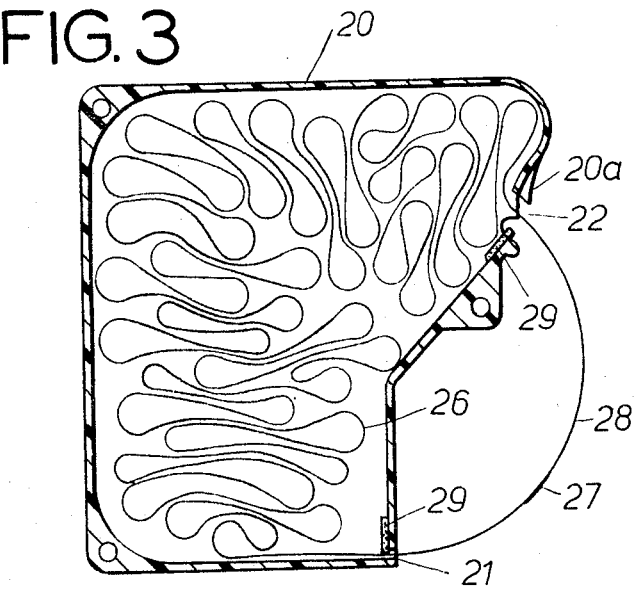
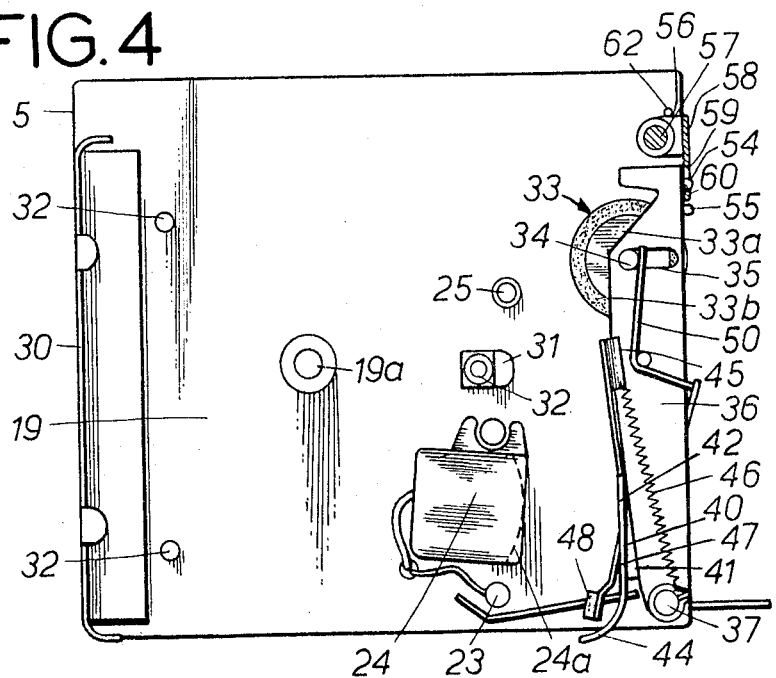
INVENTOR:
JØRGEN SIGURD LIEN.
BY
Richards & Geier
ATTORNEYS

United States Patent Office 3,271,525
Patented Sept. 6, 1966

3,271,525
SOUND REPRODUCER EQUIPPED CASH
REGISTER
Jörgen Sigurd Lien, 2–4 Mollendalsveien,
Bergen, Norway
Filed July 11, 1962, Ser. No. 208,984
Claims priority, application Norway, Aug. 22, 1961,
137,064, Patent 100,021
5 Claims. (Cl. 179—100.2)

This invention relates to cash registers and in particular to cash registers which besides having their normal function, are capable of reproducing sound. Such registers are sometimes referred to as "speaking" cash registers.

It is often desirable, especially in large shops or stores, to impart information to the customers by way of announcements. Owing to the fact that the operator of the cash register is usually fully occupied, the standard of service received by the customer is usually quite inadequate. Therefore, it is desirable to have an apparatus available which automatically makes the required announcements to the customers. These announcements can be of an advertising nature or they can take the form of advice regarding, for example, the quality or mode of operation of the goods.

Hitherto, sound-reproducing arrangements have been connected to cash registers whereby the operator's notes of every sale are replaced by a recorded statement on a register sound roll. This roll can be played back later, for example, after closing hours so as to give a survey and record of the days sale. Sound-reproducing equipment, which can be set in operation by means of suitable impulses, has previously been employed for making announcements and advertising in shops.

The known types of apparatus make use of obsolete principles of sound-reproduction resulting in sound of poor quality which is completely unsuitable for business purposes. Furthermore, they generally take up a considerable amount of space and are not very dependable.

It is an object of the present invention to provide a cash register which, in addition to its normal function, is capable of reproducing sound of good quality.

According to the present invention a cash register unit comprises a cash register and an electromagnetic sound-reproducing means which is adapted to be operatively connected therewith as a consequence of normal operation of the register and to operate wholly independently of the register immediately after the operative connection has been made.

Conveniently, the sound-reproducing means automatically puts itself out of action after a predetermined period, due to deactuating means incorporated therein.

Preferably, the sound-reproducing means is operated as a result of movement of the cash drawer of the register. In addition, manual actuating means incorporated in the unit can be used to operate the sound-reproducing means.

In order that the invention may be more clearly understood, a convenient embodiment thereof will now be described, by way of example, with reference to the accompanying drawings in which:

FIGURE 3 is a horizontal section of a cassette which houses an endless band of magnetic recording tape.

FIGURE 4 is a plan, partly in section, of the upper face of a tape player embodied in the unit, the player being in the inoperative position.

Figure 1:
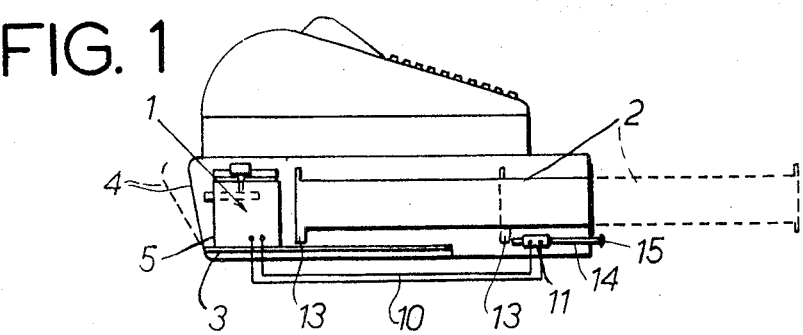
FIGURE 1 is a side elevation of a cash register unit constructed in accordance with the present invention.

Referring to FIGURE 1, an electrically-operable cash register has a tape player 1 fitted in a space at the back of the register and immediately behind the cash drawer 2 thereof when it is in the closed position. The tape player 1 is fixed on a supporting plate 3 which is mounted in the bottom of the register for sliding movement through the space formed in the rear wall of the register when a door 4, shown in dotted lines in FIGURE 1, is opened. In this way, the unit can be easily removed from the register for adjustment, inspection or repair.

Figure 2:
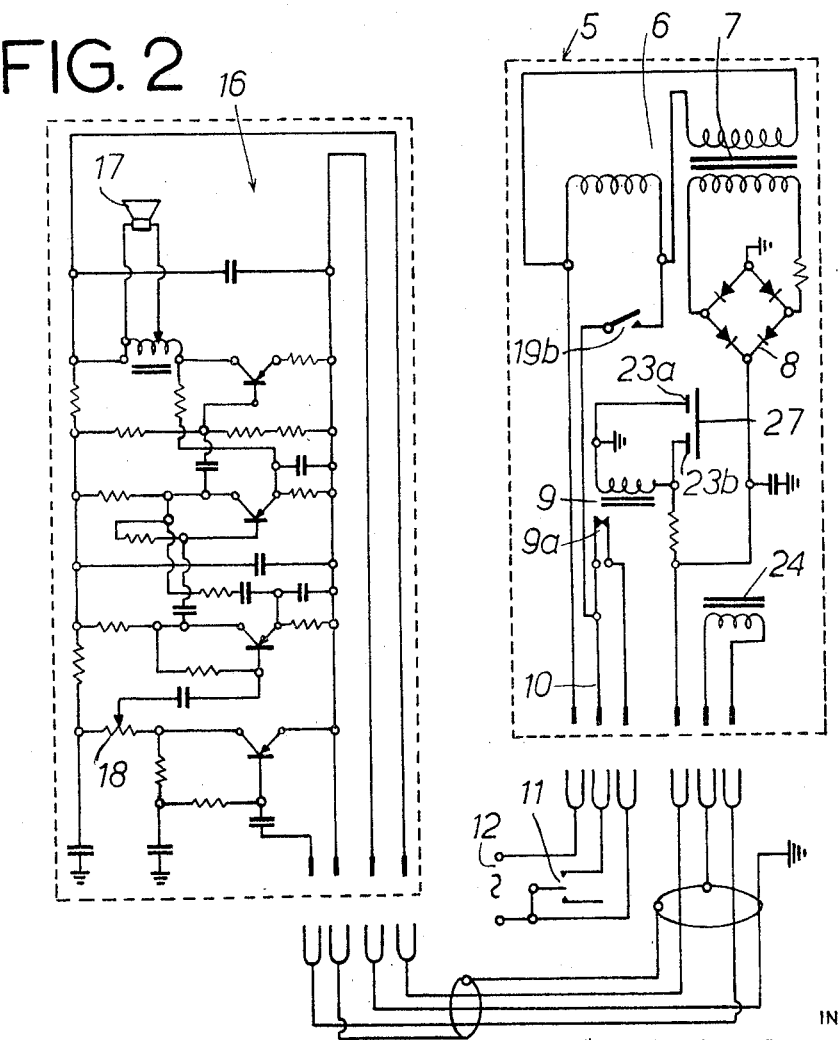
FIGURE 2 is a circuit diagram of the cash register unit of FIGURE 1.
Figure 5:
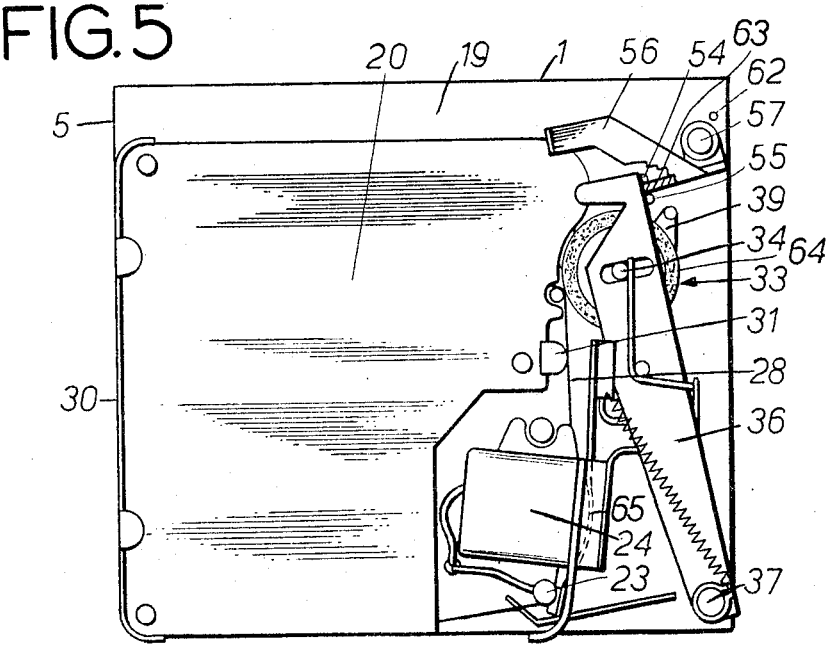
FIGURE 5 is a plan of the upper face of the tape player when in the operative position and with the tape cassette of FIGURE 3 mounted thereon.
Figure 6:
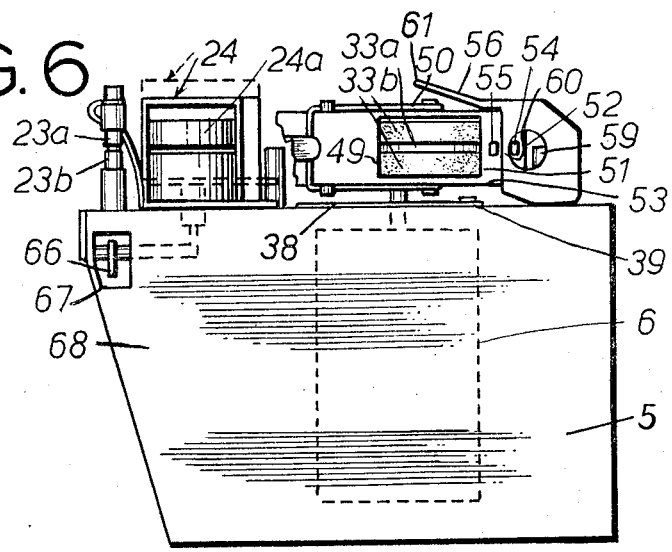
FIGURE 6 is a side elevation, partly in section, of the tape player in the operative position as shown in FIGURE 5.

Referring to FIGURES 1 and 2, the tape player 1 comprises a metal casing 5 housing an electric motor 6, a transformer 7, a rectifier 8 and a relay 9 which are arranged to be connected in an electric circuit. The relay 9 is connected by a lead 10 to a pressure contact switch 11 for connection to the mains 12. The switch 11 is arranged in the path of movement of the drawer 2, a lug 13 formed at the rear end of the drawer and projecting downwardly therefrom being adapted to close the switch as the drawer approaches its fully extended position (shown in dotted lines in FIGURE 1). A rod 14, having an end 15 projecting outwardly of the front of the register, is also adapted to be operatively connected to the switch 11. The operator of the register is able to close the switch simply by pulling out the end 15.

A low frequency amplifier unit 16 incorporating a loudspeaker 17 and a volume control 18 therefor is also mounted at the rear of the register and alongside the tape player 1 with which provision for electrical connection is made. The unit 16 is of conventional form so that it is considered unnecessary to include precise details of its operation which is well known in the art.

Referring more particularly to FIGURES 3 to 6, the upper face of the tape player 1 constitutes a platform 19 for the support of a detachable transparent, plastic tape cassette 20 and, in spaced relationship between an outlet 21 and an inlet 22 thereof, there are arranged a contact breaker 23, having oppositely polarisable halves 23a, 23b, and a sound or playback head 24 both of which are connected to the relay, and a metal capstan 25 in operative connection with the electric motor 6. The greater part of an endless band 26 of magnetic recording tape, which includes a short strip of metal foil 27, is disposed within the cassette, while the remainder constitutes a loop 28 arranged to pass between the outlet 21 and the inlet 22 in intimate contact with a metal contact surface 24a of the playback head 24 and the capstan 25. Pads 29 of soft textile material are provided at the inlet and outlet of the cassette so that wear on the recording surface of the tape due to friction is kept at a minimum.

The cassette 20 is shaped so as to be readily sprung into position on the platform 19 between an upstanding bracket 30 secured along one side of the platform and a metal spring strip 31 located between the playback head 24 and the capstan 25, the mounted cassette being supported above the surface of the platform by means of pegs 32.

An upstanding spring-loaded push button 19a (see FIGURE 4) is provided centrally of the platform 19 and is operatively connected with a switch 19b located within the metal casing 5 (see FIGURE 2). The height by which the button 19a projects above the surface of the platform 19 is such that when the cassette 20 is sprung into position, it urges the button downwards against its spring-loading thereby closing the switch 19b and enabling the tape player 1 to be operated by the cash drawer. As soon as the cassette is removed, the button 19a springs back into its original upstanding position causing the switch 19b to open and the circuit of the tape player to be broken. Thus when the cassette is not mounted on the platform, the cash drawer 2 can be opened without unnecessarily operating the tape player.

A pressure roller 33 includes a circular solid metal portion 33a around the periphery of which are arranged a pair of axially spaced rubber wheels 33b. The roller 33 also has a central axle 34 the ends of which engage in a pair of elongated slots 35 cut in the sides and at one end of a roller supporting arm 36 of substantially channel-shaped cross-section. The supporting arm 36 is arranged to pivot about a fixed pin 37 so that the rubber wheels 33b of the roller 33 can be moved into and out of pressure contact with the captsan 26 and the loop 28 of the tape. When the roller 33 is in its pressure-applying position, a portion 20a of the cassette 20 which projects into the inlet 22 is received in the spacing between the rubber wheels 33b. In this way, the possibility of passage of tape between the cassette and the roller on rotation of the latter is avoided.

A flexible arm 38 has one end 39 pivotally connected to a position on the platform 19 which lies substantially beneath the pressure roller 33. The other end of the arm 38 is formed with a jaw 40 of insulating material. The jaw 40 is roughly of U-shape in cross-section having sides 41 bent outwardly to form longitudinal flanges 42. An extension 44 of the upper flange 42 provides a guide arm for the tape just before it reaches the contact breaker 23. A rectangular metal strip 45 secured centrally of the arm 38 is held against the supporting arm 36 by an extension spring 46 connected between the upper ends of the strip and the pin 37. Thus pivotal movement of the supporting arm 36 towards the capstan 25 and against the rectangular strip 45 is opposed by the strength of the spring 46. A copper branch arm 47 has one end secured to the strip 45 while the other free end carries a soft pressure pad 48.

In the base of the channel of the supporting arm 36 immediately below the pressure roller 33, there is a rectangular slot 49 having a length substantially equal to the diameter of the roller. A hair pin spring 50 is suitably arranged around the supporting arm 36 so that each of its ends exerts a pressure on a corresponding end of the axle 34 of the roller 33, thereby causing the ends of the axle to be forced against the top ends of the elongated slots 35.

Between a shorter side 51 of the rectangular slot 49 and the end 52 of the bottom face 53 of the base of the channel of the supporting arm 36, are located a pair of aligned studs 54, 55 in close proximity to each other. A lever 56 for actuating the supporting arm 36 is pivoted about a pin 57 which is in alignment with the pin 37 and in the opposite corner of the platform 19 thereto. The lever 56 has a flat base portion 58 which projects upwardly at right angles to the plane of the platform. The base portion 58 has a circular slot 59 adjacent its inner edge thereby providing a narrow strip 60 between the slot and the inner edge which is just wide enough to fit between the studs 54, 55. The lever 56 also has an upturned end 61 which renders it more suitable for manual operation. When the strip 60 is positioned between the studs 54, 55, the lever 56 is in the inoperative position and the base of the channel of the supporting arm 36 and the base portion 58 of the lever 56 are substantially aligned along the edge of the platform 19 between the pins 37 and 57. A stop 62 at the rear of the pin 57 prevents pivotal movement of the lever out of the inoperative position in a counter-clockwise direction.

On rotating the actuating lever 56 in a clockwise direction towards the operative position, the pressure exerted by the lever against the stud 54 causes the supporting arm 36 to pivot about its pin 37. The arcuate movement of the arm 36 brings the roller 33 into pressure contact with the capstan 25 and the tape. Due to the area of contact between the roller and the capstan, the roller is rotated by the capstan when the latter is driven by the electric motor 6 and the roller in turn imparts longitudinal movement to the loop 28 of the endless band 26 of tape past the playback head 24. During this initial movement of the lever 56, the pressure exerted thereon must be sufficient to overcome the strength of the extension spring 46. This movement causes the inner edge 63 of the base portion 58 of the lever 56 to ride inwardly over the stud 54.

As soon as the roller 33 makes pressure contact with the capstan 25, the strength of the hair pin spring 50 also opposes further movement of the lever 56. As a result of such movement, the lever 56 causes the inner edge 63 of the base portion 58 to ride outwardly over the stud 54 until the edge is locked between the studs 54, 55 at a position substantially at right angles to its inoperative position. This final movement of the lever 56, while not affecting the position of the pressure roller 33, rotates the supporting arm 36 still further, relative movement between the roller and the arm being made possible by the elongated slots 35 and the rectangular slot 49 through which a portion 64 of the roller is able to protrude. Thus the length of the loop 28 of tape between the outlet 21 and the inlet 22 of the cassette 20 can be adjusted by hand on turning the protruding portion 64 of the roller 33. This is particularly convenient when one wishes to ensure that the loop 28 of tape is making intimate contact with the capstan 25 and the metal contact surface 24a of the playback head 24.

When the supporting arm 36 is pivoted towards the capstan 25, pressure is also exerted on the rectangular metal strip 45 causing both the flexible arm 38 and its copper branch arm 47 to be urged towards the playback head 24 and the contact breaker 23. The final movement of the lever 56 forces the flanges 42, 43 of the U-jaw 40 against the metal contact surface 24a of the playback head 24 on either side of the tape, while the soft pressure pad 48 of the copper branch arm 47 is simultaneously pressed against the loop 28 of the tape where it passes over the contact breaker 23. A central portion 65 of the branch arm 47 is located between the sides 41 of the U-jaw 40 and, moreover, is spaced from the tape which contacts the playback head 24. When the U-jaw 40 is in this operative position, it serves to close off the metal contact surface 24a of the playback head.

A manually operable lever 66 having an end projecting through a slot 67 in the side 68 of the casing 5 is connected to the playback head 24 for vertical reciprocation thereof between two extreme positions and laterally of the loop 28 of the tape. In this way, two tracks which have been taken up on the tape using a conventional dual-track tape recorder can be picked up by the playback head and transmitted to the loudspeaker 17 of the low frequency amplifier unit 16.

The mode of operation of the apparatus is as follows:

The cash drawer 2 is opened by conventional mechanical and electrical means (not shown) forming part of the register, so that the lug 13 closes the contact switch 11 thereby resulting in the energisation of the electric motor 6. When the tape player 1 is not in use, the metal foil 27 of the endless band 26 of magnetic recording tape is normally in contact with the contact breaker 23 between the two oppositely polarised halves 23a, 23b thereof, since it is in this position that the motor 6 can be deenergised and the player stopped. The contact switch 11 is allowed to remain closed for a time sufficient to enable the pressure roller 33 actuated by the motor 6 through the capstan 25 to move the metal foil 27 out of contact with the contact breaker 23. This energisation of the motor 6 results in current being passed through the transformer 7 which energises the relay 9 by feeding a low voltage thereto, thereby causing relay contacts 9a to be closed.

The relay 9 is then permanently in circuit with the mains 12 and the motor 6. Thus when the drawer 2 is moved so that the lug no longer closes the switch 11, the motor 6 will remain energised and the capstan will be continuously driven thereby.

Longitudinal movement is imparted to the tape past the playback head 24 due to the tractive contact area between the capstan 25 and the pressure roller 33. This traction rotates the pressure roller 33 which in turn is in tractive contact with the non-recording side of the tape. The passage of the endless band 26 of tape induces a low voltage in the playback head 24 which is amplified by the amplifier unit 16 and transmitted to the loudspeaker 17 in the usual way.

The cassette 20 is made a trifle wider than the tape itself so that the tape forms a continuously varying series of convolutions as it passes from the cassette.

When the endless tape band 26 has gone the while way round, the strip of metal foil 27 again makes contact between the oppositely polarised halves 23a, 23b of the contact breaker 23 which are connected to the relay 9. As a result, the relay is short-circuited causing the contacts 9a thereof to open and the current to the electric motor 6 to be cut off.

Should, however, it be desired not to stop the operation of the tape player, it is only necessary to leave the drawer 2 open with the switch 11 closed by the lug 13. When the metal foil 27 comes into contact with the contact breaker 23, the motor 6 will only be momentarily deenergized, immediate reenergisation taking place by virtue of the closed circuit formed by the switch 11. Subsequent operation of the tape player will then occur as described above. The fact that the tape player can, if desired, be operated continuously makes the cash register even more advantageous for business purposes.

If it is desired to hear the second track on the tape, it is only necessary to move the playback head 24 into its other extreme position by means of the lever 66 and reopen the cash drawer as before.

A feature of the cash register of the described embodiment is that the tape player may be operated so as not to interfere with the subsequent normal operation of the register when once the player has been actuated.

Although in the present embodiment, the tape player is shown to be energised as a result of the cash register drawer being opened, the invention is not limited to this mode of operation. In fact, the necessary electrical connection with the tape player could be supplied, for example, through the operation of one or more push buttons of the register. Similarly, the playback head lever 66 need not be manually operable but could be controlled, for example, by a cash register button through appropriate electrical and/or mechanical means.

What I claim is:

1. The combination of a cash register having a cash drawer movable from a closed position to an open position and versa versa; with a sound reproducing device having a playback head and an electric motor; a low frequency amplifier having a loud speaker; means supplying electrical current to said playback head, said motor and said amplifier and comprising a contact switch located in the path of movement of said cash drawer and closed by said cash drawer when it is adjacent its open position; a manually operable rod connected with said switch for closing said switch independently of the movement of the cash drawer, and means energized by the electrical current for maintaining the flow of electrical current after said switch is opened, magnetic recording tape adapted to engage said playback head, a drive for said magnetic tape, means operatively connecting said drive with said motor, and means connected with said tape and de-energizing the last-mentioned means after a predetermined length of tape has been moved by said drive.

2. A device according to claim 1, wherein said switch is located beneath the cash drawer, said cash drawer comprising a stop on the bottom thereof adapted to engage said switch, wherein the third-mentioned means comprise a capstan in driving connection with said electric motor, wherein said drive comprises a pressure roller adapted to be driven by the capstan and to make tractive contact with magnetic recording tape and wherein the second-mentioned means comprises a relay and a transformer connected with said relay, whereby when the drawer is opened the stop closes the contact switch so that the motor is momentarily energised causing the transformer to energise the relay whereby the motor is permanently energised and a longitudinal movement is imparted to the tape past the playback head due to tractive contact being made between the roller and the tape.

3. A device according to claim 2, comprising a spring-loaded pivotable arm supporting said pressure roller and movable manually against the spring-loading towards the capstan and to bring the pressure roller into locking abutment therewith.

4. A device according to claim 2, wherein the magnetic tape is in the form of an endless band and wherein the last-mentioned means comprises a metal strip and a contact breaker having oppositely polarised halves connected to the relay, said strip being carried by said band and being adapted to engage said contact breaker, thereby enabling the relay to be short-circuited and the motor deenergised.

5. A device according to claim 2, wherein the playback head is manually reciprocable laterally of the tape thereby enabling the head to pick up more than one track recorded on the tape.

References Cited by the Examiner

UNITED STATES PATENTS

| | | | |
|---|---|---|---|
| 786,304 | 4/1905 | Mniszewski | 235—7 |
| 2,167,459 | 7/1939 | Long. | |
| 2,499,700 | 3/1950 | Tinkham et al. | 179—100.2 |
| 2,571,973 | 10/1951 | Walker. | |
| 2,615,989 | 10/1952 | Thad | 179—100.2 |
| 2,876,005 | 3/1959 | Eash | 179—100.2 X |
| 3,088,661 | 5/1963 | Bingham et al. | 179—100.2 X |

BERNARD KONICK, *Primary Examiner.*

IRVING L. SRAGOW, *Examiner.*